US010753498B2

(12) United States Patent
Landacre et al.

(10) Patent No.: US 10,753,498 B2
(45) Date of Patent: Aug. 25, 2020

(54) FLOW-THROUGH LIQUID VALVE

(71) Applicant: MAC Valves, Inc., Wixom, MI (US)

(72) Inventors: Brett Anthony Landacre, Bloomfield Hills, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 98 days.

(21) Appl. No.: 16/171,450

(22) Filed: Oct. 26, 2018

(65) Prior Publication Data

US 2019/0226598 A1 Jul. 25, 2019

Related U.S. Application Data

(60) Provisional application No. 62/621,641, filed on Jan. 25, 2018.

(51) Int. Cl.
*F16K 31/06* (2006.01)
*F16K 31/04* (2006.01)
(Continued)

(52) U.S. Cl.
CPC .......... *F16K 31/047* (2013.01); *B67D 1/1272* (2013.01); *B67D 1/14* (2013.01);
(Continued)

(58) Field of Classification Search
CPC .. F16K 31/047; F16K 31/0651; F16K 31/658; B67D 1/1272; B67D 1/14; Y10T 137/87378; Y10T 137/87507
(Continued)

(56) References Cited

U.S. PATENT DOCUMENTS 2,267,515 A 12/1941 Wilcox et al.
3,100,103 A * 8/1963 Bullard ................ F16K 31/408
251/30.03
(Continued)

FOREIGN PATENT DOCUMENTS

EP 1 277 694 A2 1/2003
GB 208703 A 7/1924
(Continued)

OTHER PUBLICATIONS

Extended European Search Report and Written Opinion of the European Patent Office in corresponding European Application No. EP 19 15 2117, dated Jun. 28, 2019.

*Primary Examiner* — Kevin F Murphy
*Assistant Examiner* — Jonathan J Waddy
(74) *Attorney, Agent, or Firm* — Harness, Dickey & Pierce, P.L.C.

(57) ABSTRACT

A valve including a housing, a valve seat provided in the housing, and an armature assembly positioned in the housing proximate the valve seat. The armature assembly is movable towards and away from the valve seat, and includes a first armature, and a second armature that is movable relative to the first armature. The valve also includes a coil that is configured to actuate the armature assembly away from the valve seat to open the valve, wherein upon application of a first current to the coil, the first armature and the second armature are each actuated away from the valve seat to a first open state, and upon application of a second current that is greater than the first current to the coil, the second armature is actuated away from the first armature to a second open state that is greater than the first open state.

16 Claims, 8 Drawing Sheets

(51) Int. Cl.
*B67D 1/12* (2006.01)
*B67D 1/14* (2006.01)

(52) U.S. Cl.
CPC ...... *F16K 31/0651* (2013.01); *F16K 31/0658* (2013.01); *Y10T 137/87378* (2015.04); *Y10T 137/87507* (2015.04)

(58) Field of Classification Search
USPC ..... 251/129.08, 129.21, 129.22; 137/599.16, 137/601.01, 630.15
See application file for complete search history.

(56) References Cited

U.S. PATENT DOCUMENTS

| | | | | |
|---|---|---|---|---|
| 4,624,282 | A | * | 11/1986 | Fargo ................. F16K 31/0679 137/599.07 |
| 4,760,694 | A | * | 8/1988 | Gillon, Jr. ............... B64G 1/26 137/599.16 |
| 5,735,582 | A | * | 4/1998 | Eith ........................ B60T 8/363 137/596.17 |
| 6,047,718 | A | * | 4/2000 | Konsky .................. F16K 1/443 137/1 |
| 7,011,110 | B1 | * | 3/2006 | Stark ........................ F16K 1/44 137/601.14 |
| 9,366,357 | B2 | * | 6/2016 | Zieger .................. F16K 39/024 |
| 2004/0155215 | A1 | * | 8/2004 | Kill ..................... F16K 31/0606 251/129.21 |
| 2010/0213758 | A1 | * | 8/2010 | Nanahara ................ B60T 8/363 303/20 |
| 2019/0217840 | A1 | * | 7/2019 | Stahr ..................... B60T 13/686 |

FOREIGN PATENT DOCUMENTS

| | | |
|---|---|---|
| JP | S61 13076 A | 1/1986 |
| WO | WO-2016/180737 A1 | 11/2016 |

\* cited by examiner

FLOW-THROUGH LIQUID VALVE

CROSS-REFERENCE TO RELATED APPLICATIONS

This application claims the benefit of U.S. Provisional Application No. 62/621,641, filed on Jan. 25, 2018. The entire disclosure of the above application is incorporated herein by reference.

FIELD

The present disclosure relates to a valve.

BACKGROUND

This section provides background information related to the present disclosure which is not necessarily prior art.

When beer (or other beverage or liquid or fluid) is charged with a gas, such as a carbon dioxide, to move the beer through the various supply lines, the gas is entrained to dissolve in the liquid and resides in a stable state for temperatures at or below about 30° F. The gas typically does not bubble out of the liquid, but is carried in the liquid and gives a beverage a distinctive effervescence when consumed. However, as the temperature of the fluid rises above 30° F., absent an increase in pressure on the system, the gas becomes increasingly unstable and begins to bubble or foam out of the flowing liquid. Further warming of the liquid increases the foaming effect, as the gas bubbles form and propagate downstream. Foaming is further exacerbated by disturbances in the liquid, such as the turbulence generated when the fluid is dispensed from the dispensing valve. When the liquid is warmed to 45° F. or more, such as when exposed to normal ambient room temperature, the gas becomes sufficiently unstable and so much foam is generated when it is dispensed that it is often undesirable.

One of the factors that may result in undesired increase in the temperature of the liquid is the use of a solenoid valve. In this regard, when a current is applied to the solenoid coil to actuate the valve, heat is generated that can heat the liquid flowing through the valve. This is undesirable and, therefore, a valve is needed for dispensing a liquid that does not transfer heat to the fluid during use of the valve.

Another factor that affects formation of foam in the liquid is the flow path through the valve. In this regard, if the flow path requires the fluid flowing therethrough to change direction a number of times, the amount of foam in the liquid can increase, which, as noted above, is undesirable.

SUMMARY

This section provides a general summary of the disclosure, and is not a comprehensive disclosure of its full scope or all of its features.

According to a first aspect of the present disclosure, there is provided a valve including a housing, and an armature assembly including a pole member, a valve seat, an armature positioned between the pole member and the valve seat, and a spring member that biases the armature into engagement with the valve seat. The valve also includes a coil that, when a current is applied, will actuate the armature away from the valve seat to open the valve and that, when a current is not being applied, will allow the spring member to bias the armature toward the valve seat to close the valve. The armature includes a plurality of ports formed therein that allow the liquid to flow through an interior of the armature when the valve is open, and the armature is a cylindrically-shaped member having a first bullet-shaped end and an opposite second bullet-shaped end. The first and second bullet-shaped ends correspond to conically-shaped recesses formed in the pole member and valve seat, respectively.

According to a second aspect of the present disclosure, there is provided a valve including a housing, a valve seat provided in the housing, and an armature assembly positioned in the housing proximate the valve seat. The armature assembly is movable towards and away from the valve seat, and includes a first armature, and a second armature that is movable relative to the first armature. The valve also includes a coil that is configured to actuate the armature assembly away from the valve seat to open the valve, wherein upon application of a first current to the coil, the first armature and the second armature are each actuated away from the valve seat to a first open state, and upon application of a second current that is greater than the first current to the coil, the second armature is actuated away from the first armature to a second open state that is greater than the first open state.

According to a third aspect of the present disclosure, there is provided a valve that includes a housing and a valve seat provided in the housing. A first armature that is formed of a magnetic material is configured to mate with the valve seat when the valve is in a closed state, and be spaced apart from the valve seat when the valve is in an open state. The first armature includes an axially extending passage that extends a length of the first armature, and a first plurality of fluid ports positioned radially outward from the axially extending passage that extend axially along the length of the first armature. A second armature is positioned within the axially extending passage of the first armature. The second armature is movable relative to the first armature and includes an axially extending recess formed therein that houses a magnetic plug. The second armature includes a second plurality of fluid ports positioned radially outward from the axially extending recess that extend axially along a length of the second armature. The valve also includes a coil that is configured to actuate the first and second armatures to open the valve, wherein upon application of a first current to the coil, the magnetic material of the first armature interacts with the coil to actuate the first and second armatures away from the valve seat to place the valve in a first open state, and upon application of a second current that is greater than the first current to the coil, the magnetic plug of the second armature interacts with the coil to actuate the second armature away from the first armature to place the valve in a second open state that is greater than the first open state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
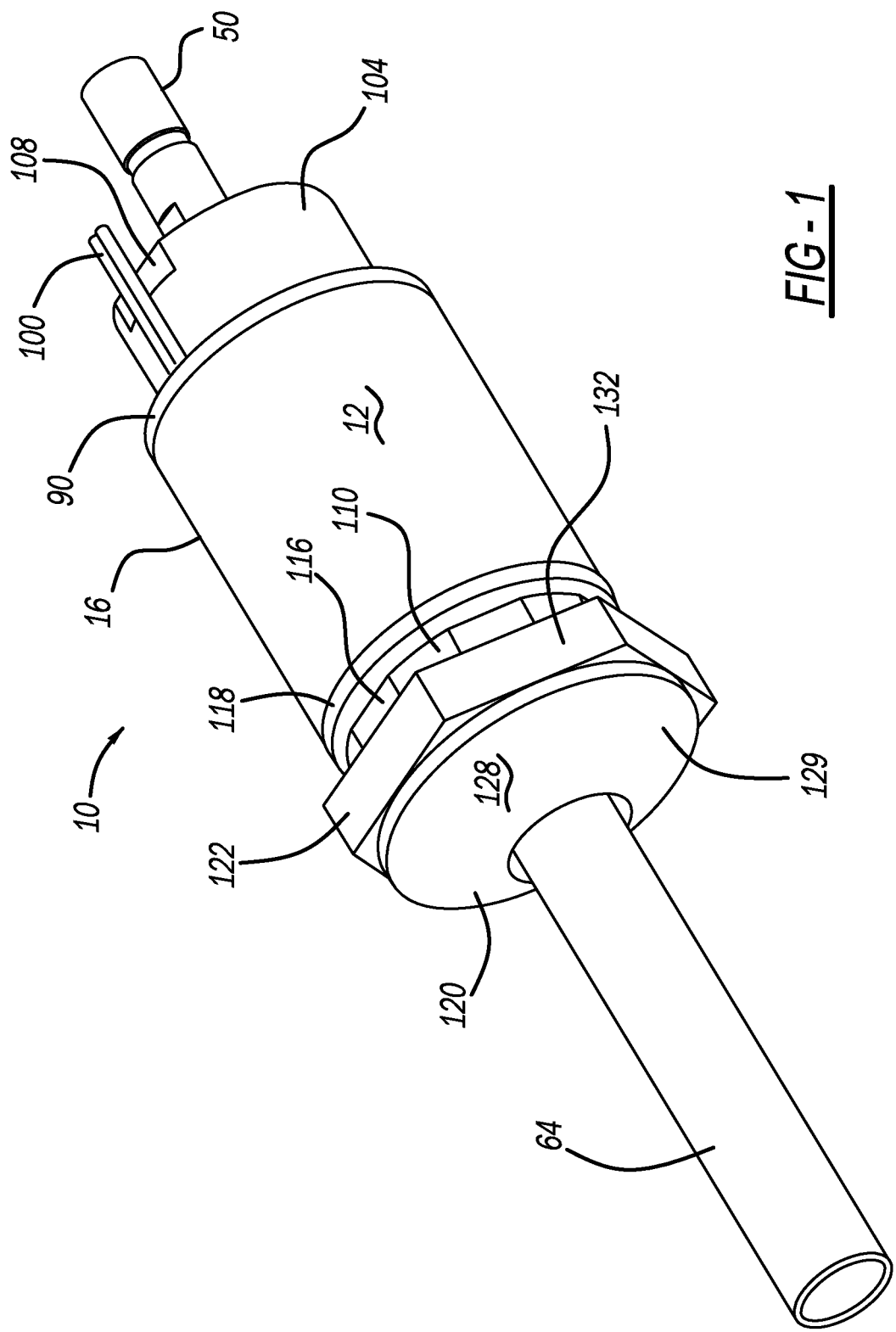
FIG. 1 is a perspective view of a valve according to a first principle of the present disclosure.

Example embodiments will now be described more fully with reference to the accompanying drawings.

FIGS. 1 to 5 illustrate a flow-through liquid valve 10 according to the present disclosure. Valve 10 is an electromechanical valve including an outer shell or housing 12, an inner armature assembly 14 that is mated with housing 12, and a coil 13 positioned between the housing 12 and the armature assembly 14 that, when energized, will actuate the armature assembly 14 to open and close valve 10. Housing 12 includes a cylindrical body 16 having a first end 18 and a second end 20. First end 18 includes a radially inwardly extending wall 22. Housing 12 may be formed of a material such as steel or any other material known to one skilled in the art that is capable of generating a magnetic field during use of the electromechanical valve 10.

Armature assembly 14 includes an inner shell 24 that includes an inner surface 26 and an exterior surface 28. Inner shell 24 houses an armature 30, a valve seat 32, and a pole member 34, with coil 13 being located between housing 12 and inner shell 24. Pole member 34 is a generally cylindrically shaped member having an outer surface 36 and an inner surface 38 that defines a flow path 40 therethrough. To provide a seal between inner shell 24 and pole member 34, a pair of o-rings 42 may be positioned between inner shell 24 and outer surface 36. A portion of pole member 34 includes a threaded surface 44 that mates with a corresponding threaded surface 46 formed on inner surface 26 of inner shell 24. Inner surface 38 of pole member 34 is cylindrical and has a first inner diameter D1, which is variable. As inner surface 38 extends toward armature 30, inner surface 38 radially expands to such that a radially expanded section 48 of inner surface having a second inner diameter D2 is formed. Similar to D1, D2 is variable. Pole member 34 may also include an inlet portion 50 formed unitary therewith. It should be understood, however, that inlet portion 50 may be separate and apart from pole member 34 and attached to pole member 34 by brazing, welding, or some other attachment method without departing from the scope of the present disclosure.

Similar to pole member 34, valve seat 32 is a generally cylindrical member having an exterior surface 52 and an inner surface 54 that defines a flow path 55. To provide a seal between inner shell 24 and valve seat 32, a pair of o-rings 56 may be positioned between inner shell 24 and exterior surface 52. In addition, valve seat 32 includes a radially outwardly extending flange 58 that defines a shoulder for abutting a terminal end 60 of inner shell 24. Inner surface 54 of valve seat 32 is cylindrical and has an inner diameter D3 that is substantially equal to inner diameter D1 of armature 30. It should be understood, however, that D1 and D3 can be of varying size and not necessarily equal. As inner surface 54 extends away from armature 30, inner surface 54 radially expands such that a radially expanded section 62 is formed. An inner diameter D4 of inner surface 54 at radially expanded section 62 may be greater than inner diameter D2 of pole member 34 (as illustrated), or inner diameter D4 can be substantially equal to inner diameter D3. Diameter D4, however, is variable. Valve seat 32 may also include an outlet portion 64 unitary therewith. It should be understood, however, that outlet portion 64 may be separate and apart from valve seat 32 and attached to valve seat 32 by brazing, welding, or some other attachment method without departing from the scope of the present disclosure.

Figure 3:
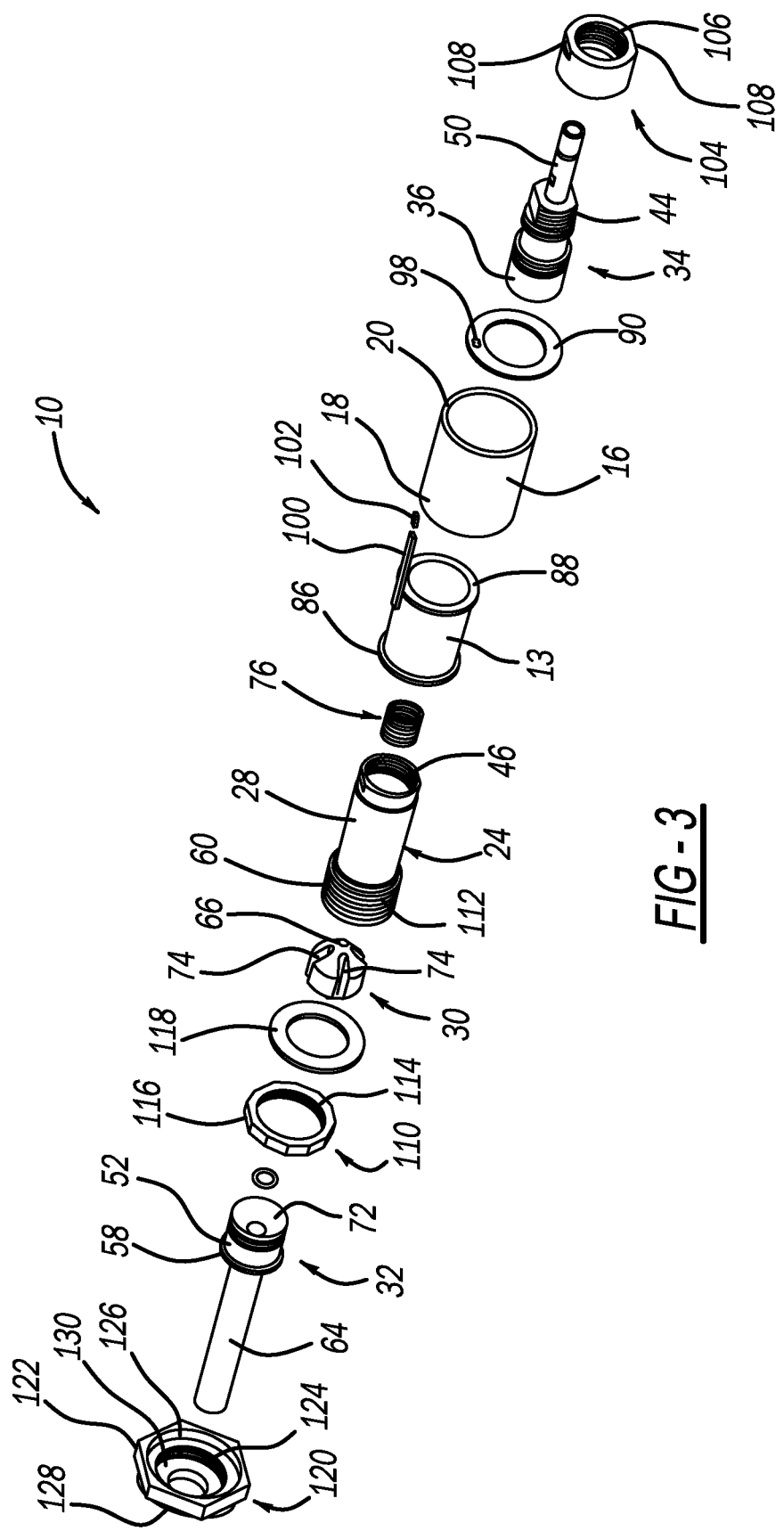
FIG. 3 is an exploded perspective view of the valve illustrated in FIG. 1.

Armature 30 is a cylindrically-shaped member having a first bullet-shaped end 66 and a second bullet-shaped end 68 that mate with correspondingly conically-shaped seating surfaces 70 and 72 formed in each of pole member 34 and valve seat 32 such that when armature 30 is actuated between closed (FIG. 4) and open (FIG. 5) positions the bullet-shaped ends 66 and 68 will seat against the conically-shaped seating surfaces 70 and 72, respectively. Armature 30 may be formed of a magnetic material that is designed to cooperate with coil 13 when coil 13 is energized. Armature 30 includes a plurality of flow ports 74 that extend axially through armature 30 from bullet-shaped end 66 toward second bullet-shaped end 68, and also radially outward toward inner shell 24 such that armature 30 is butterfly-shaped when viewed along an axial length of armature 30. The shape of flow ports 74 is best shown in FIG. 3. Although armature 30 is illustrated in FIG. 3 as having four flow ports 74, it should be understood that a greater or lesser number of flow ports 74 can be used, without limitation. When valve 10 is in an open state, fluid is allowed to flow from inlet portion 50 through pole member 34, through flow ports 74 toward and through valve seat 32, and out of outlet portion 64. Because flow ports 74 are axially aligned with flow paths 40 and 55, fluid flowing through valve 10 is subjected to less turbulence when flowing through valve 10. Further, bullet-shaped end 66 allows fluid to flow easily into and exit from flow ports 74 to further decrease turbulence. Thus, if the fluid is beer or some other type of carbonated beverage, less foam is produced when fluid travels through valve 10. When valve 10 is in a closed state (FIG. 4), bullet-shaped end 68 of armature 30 seats against valve seat 32. To ensure that no fluid may get past valve seat 32 when valve 10 is closed, conically-shaped surface 72 of valve seat 32 may include a seal member 73 that engages with bullet-shaped end 68 of armature 30.

Figure 4:
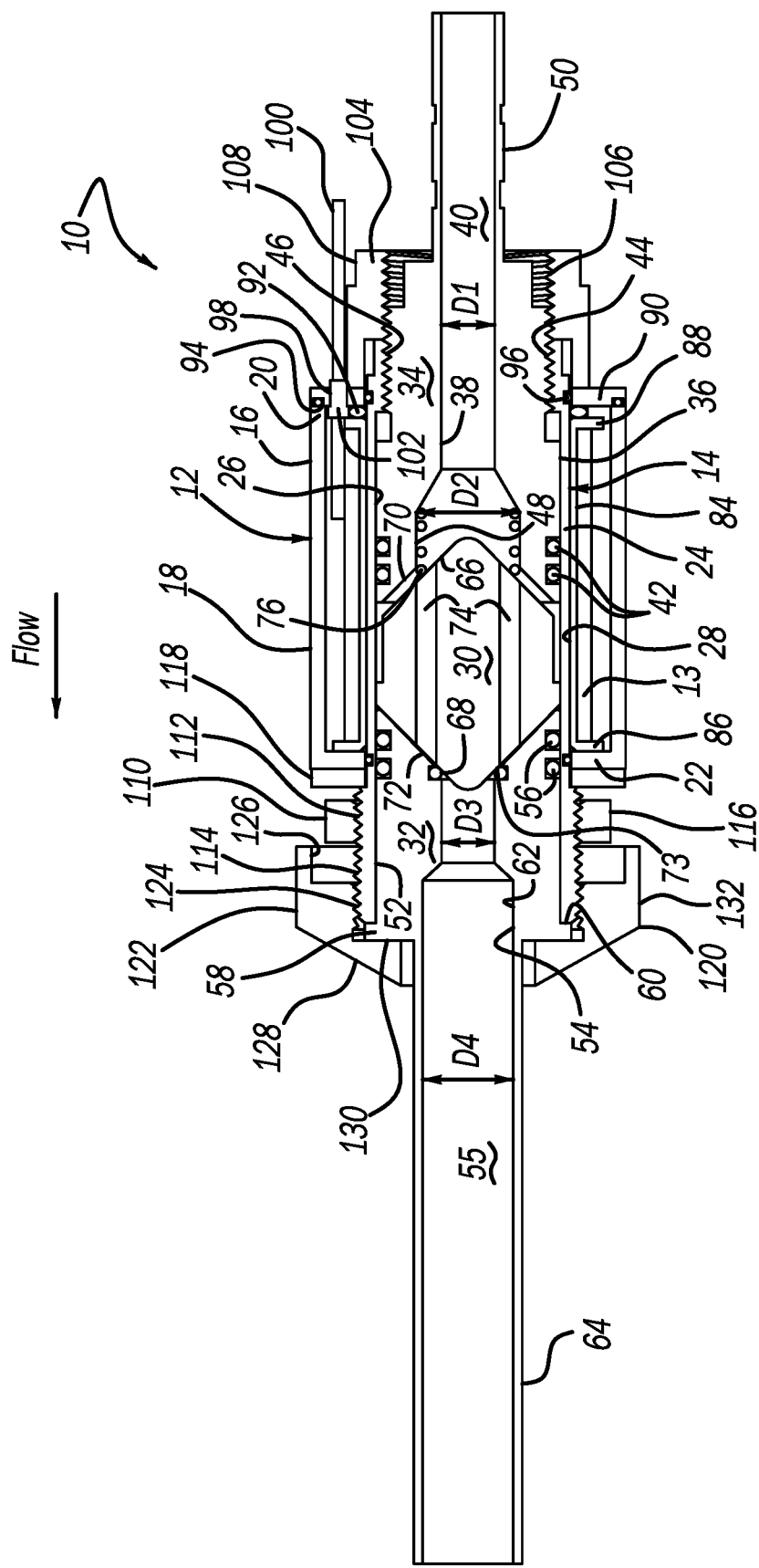
FIG. 4 is a cross-sectional view of the valve illustrated in FIG. 3, in a closed state.

A spring member 76 is positioned between armature 30 and pole member 34 within radially expanded section 48 of pole member 34 and is configured to bias armature 30 into engagement with valve seat 32 when valve 10 is in a closed state (FIG. 4). Spring member 76 is illustrated as being a coil spring, but other springs known to one skilled in the art can be used, if desired.

As noted above, coil 13 is located between armature assembly 14 and housing 12. Coil 13 is located within a cylindrical coil seat 84 with one end 86 abutted against radially inwardly extending wall 22 of housing 12, and another end 88 located proximate second end 20 of housing 12. To ensure coil 13 and coil seat 84 remain seated against radially inwardly extending wall 22, an annular plate 90 is positioned about inner shell 24 and seated against second end 20 of housing 12. A first seal member 92 is located between coil seat 84 and annular plate 90, a second seal member 94 is located between second end 20 and annular plate 90, and a third seal member 96 is located between annular plate 90 and inner shell 24.

Figure 2:
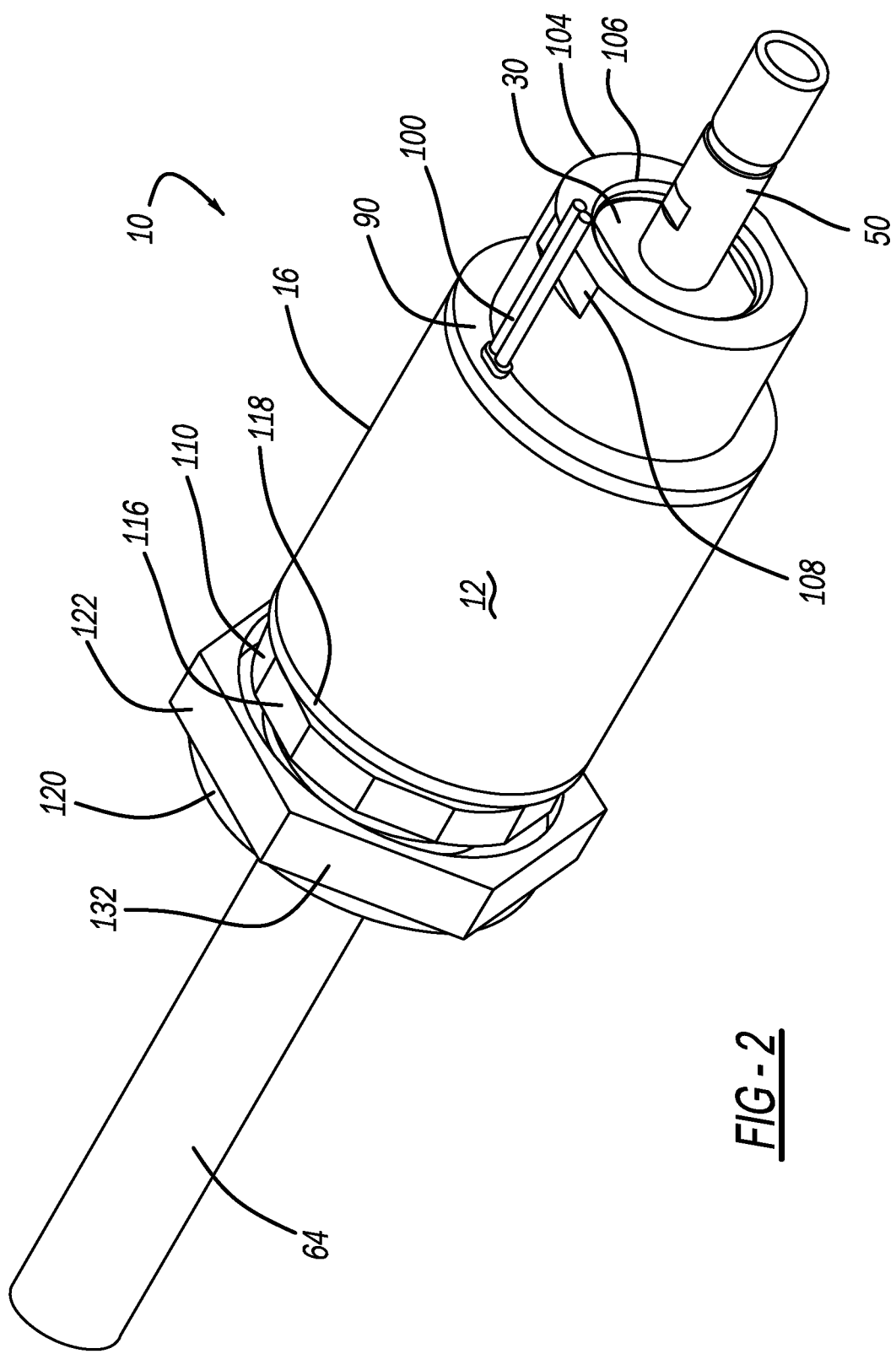
FIG. 2 is another perspective view of the valve illustrated in FIG. 1.

Annular plate 90 includes an aperture 98 for allowing a conductor 100 to pass through annular plate 90 and provide a current to coil 13. A coupling 102 is located within aperture 98 and seals conductor 100. To ensure annular plate 90 remains properly seated against second end 20 of housing 12, a cylindrically shaped cap member 104 is threadingly engaged at 106 with threaded surface 44 of pole member 34 that sandwiches annular plate 90 against second end 20 of housing 12. To enable cap member 104 to be secured to armature assembly 14, as best shown in FIGS. 1 and 2, cap member 104 includes detents 108 that allow cap member 104 to be gripped and rotated appropriately to engage and disengage cap member 104 from pole member 34.

Figure 5:
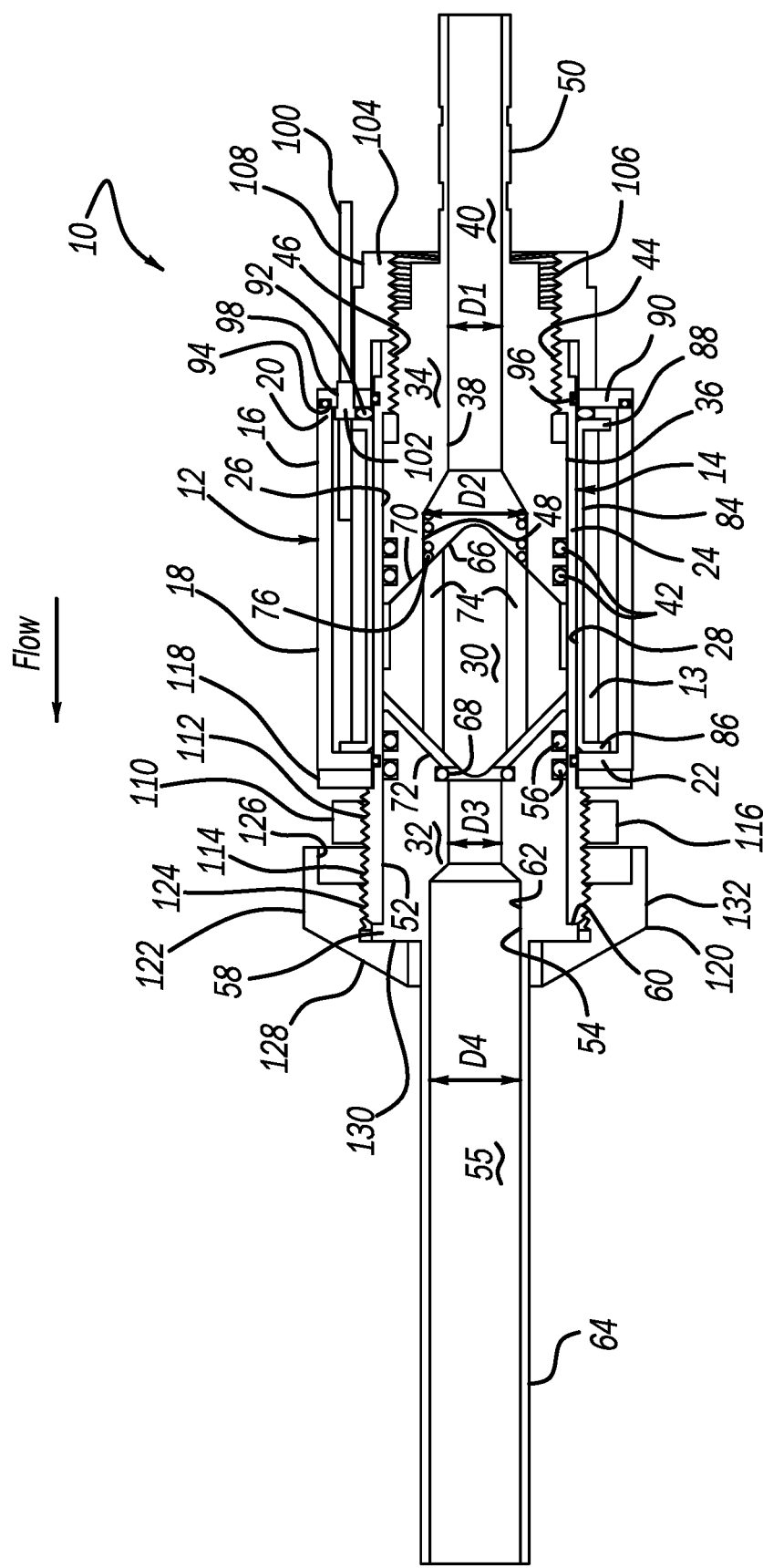
FIG. 5 is a cross-sectional view of the valve illustrated in FIG. 3, in an open state.

As illustrated in FIGS. 4 and 5, housing 12 is not secured to armature assembly 14. Thus, to ensure that housing 12 and coil 13 are properly located about armature assembly 14, a lock nut 110 that threadingly engages with an outer threaded surface 112 of inner shell 24 is used in conjunction with cap member 104. Lock nut 110 includes a cylindrical threaded surface 114 for engaging with outer threaded surface 112, and a hexagonally contoured outer surface 116 that allows lock nut 110 to be tightly connected to inner shell 24 using a wrench or the like. Although not required by the present disclosure, an annular washer 118 may be positioned between lock nut 110 and housing 12 to prevent excessive force being applied to housing 12 and coil 13 from each of cap member 104 and lock nut 110.

Lastly, valve 10 includes a bonnet 120 attached to inner shell 24 at a location of valve 10 proximate valve seat 32. Bonnet 120 includes a cylindrically-extending portion 122 including threads 124 on an inner surface 126 thereof for coupling to outer threaded surface 112 of inner shell 24. Bonnet 120 also includes a radially inwardly extending cover 128 that is configured to receive fluid outlet portion 64 therein. An inner surface 130 of cover 128 abuts against radially outwardly extending flange 58 of valve seat 32, and an exterior surface 132 of cylindrically-extending portion 122 may have a hexagonally-shaped profile for allowing bonnet 120 to be rotated relative to inner shell 24 and threadingly secured thereto.

FIG. 4 illustrates valve 10 when valve 10 is in a closed state. In this regard, no current is applied to conductor 100 such that coil 13 is not energized. FIG. 5 illustrates valve 10 when valve 10 is in an open state. As noted above, to actuate armature assembly 14, a current is applied to coil 13 from a current source (not shown) via conductor 100. When coil 13 is energized, coil 13 will magnetically interact with armature 30 to pull armature 30 back toward pole member 34. As armature 30 is pulled back toward pole member 34, fluid from fluid inlet portion 50 will enter valve 10, travel through flow ports 74 formed in armature 30, and through valve seat 32 to fluid outlet 64. To close valve 10, current from the current source (not shown) to coil 13 is stopped such that coil 13 is no longer energized, which removes the magnetic interaction between coil 13 and armature 30. Spring member 76 then biases armature 30 back into sealing engagement with valve seat 32.

As shown in FIGS. 3 and 4, armature 30 includes flow ports 74 that allow the fluid to flow through armature 30 rather than around armature 30 when valve 10 is open. This configuration allows armature 30 to be located closer to coil 13. Further, since substantially less fluid is located between armature 30 and coil 13, less interference that affects magnetic interaction between armature 30 and coil 13 is present, which allows for less power or current being needed to actuate armature 30. This is a significant aspect of the present disclosure in that because less power is needed to actuate valve 10, less heat is generated when coil 13 is energized. Because less heat is generated, less heat is transferred to the fluid passing through valve 10. Valve 10, therefore, can be used in fluid applications such as beverage delivery where it is undesirable for the fluid to be heated during use of the valve 10.

Although the flow of fluid through valve 10 has been described as being from fluid inlet 50 to fluid outlet 64, it should be understood that valve 10 can operate in the opposite direction as well. That is, fluid outlet 64 may function as a fluid inlet, and fluid inlet 50 may function as a fluid outlet.

Figure 6:
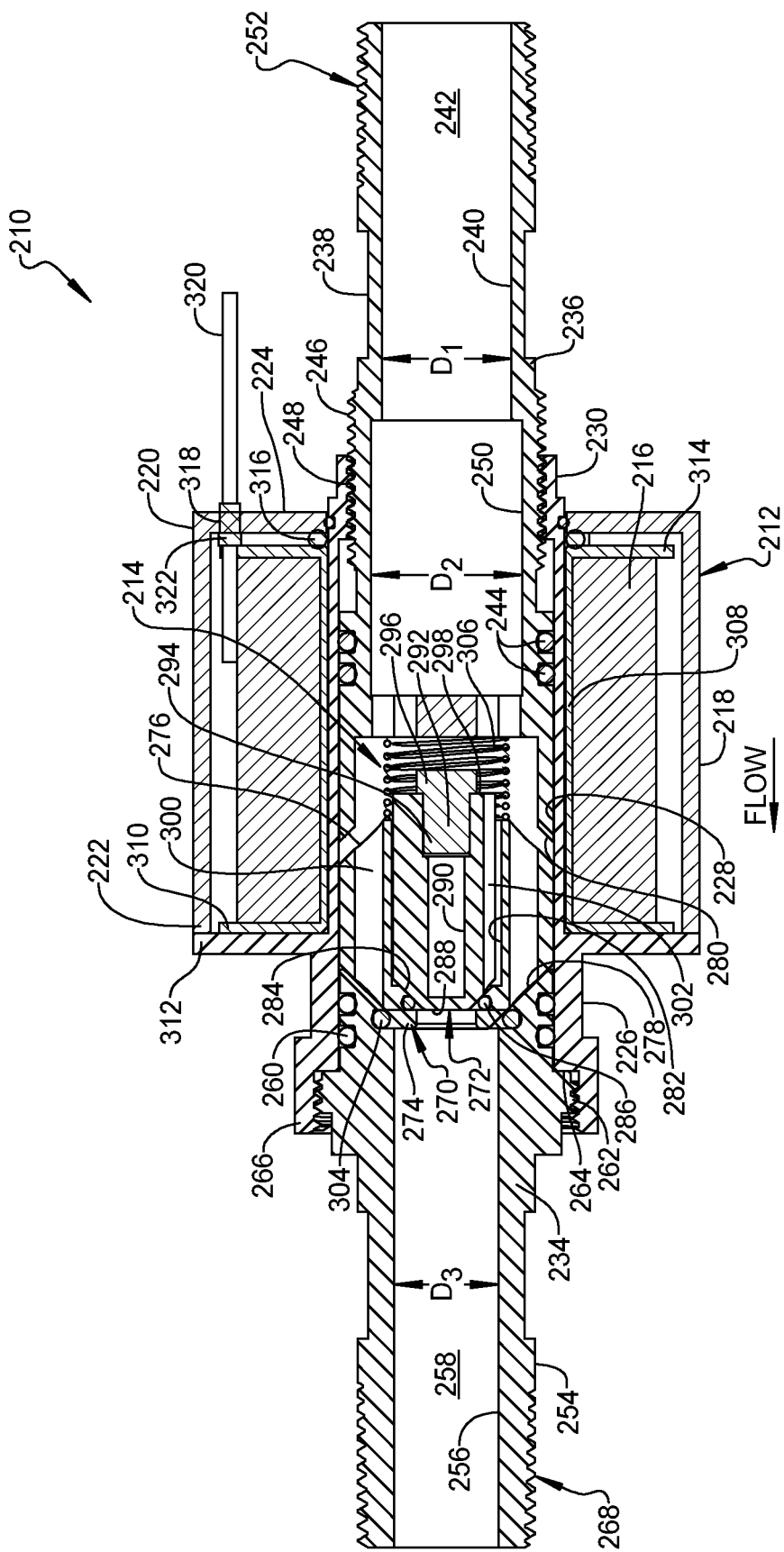
FIG. 6 is a cross-sectional view of another valve according to a second principle of the present disclosure, in a closed state.
Figure 7:
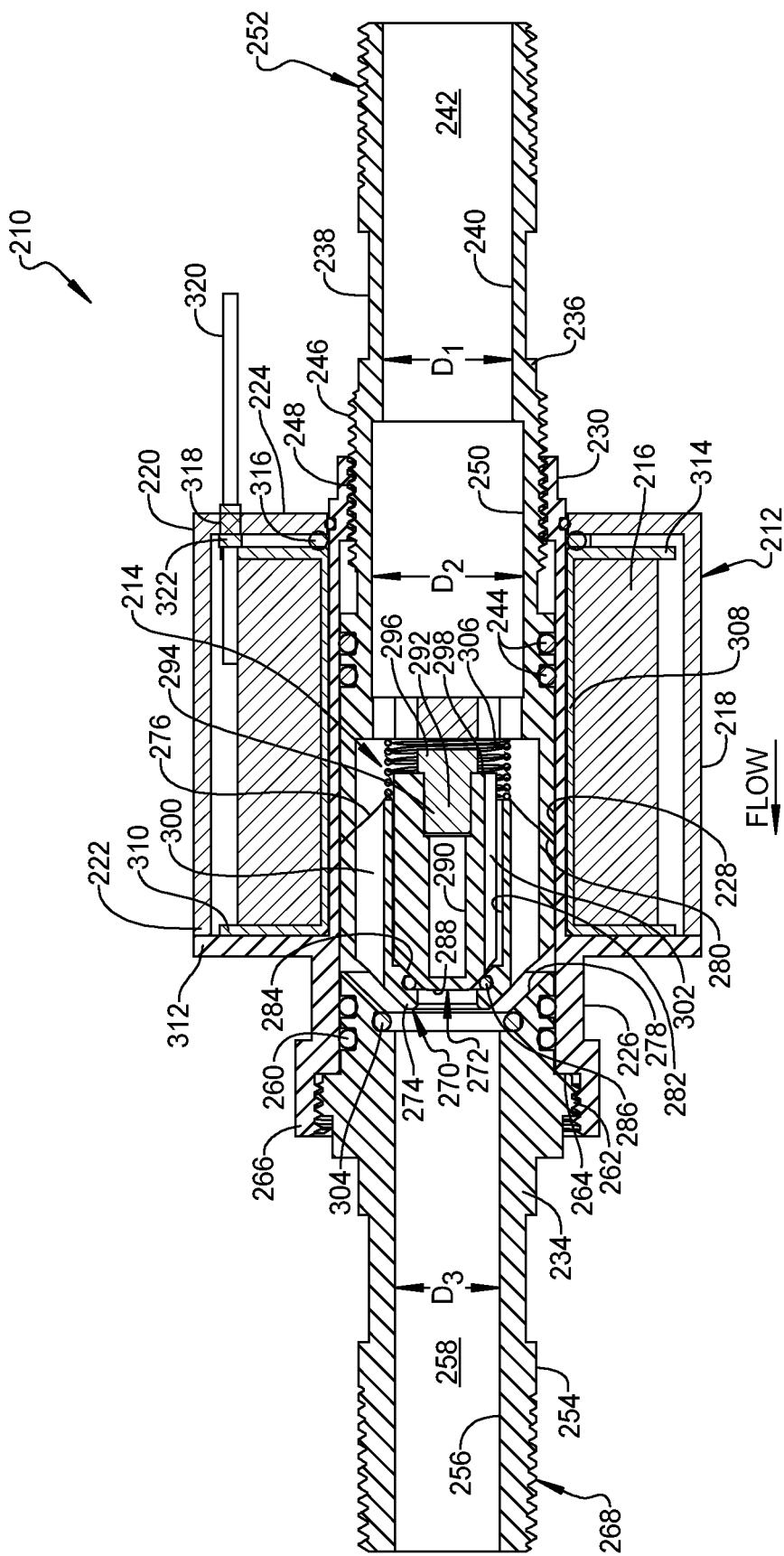
FIG. 7 is a cross-sectional view of the valve illustrated in FIG. 6, in a low-flow state.
Figure 8:
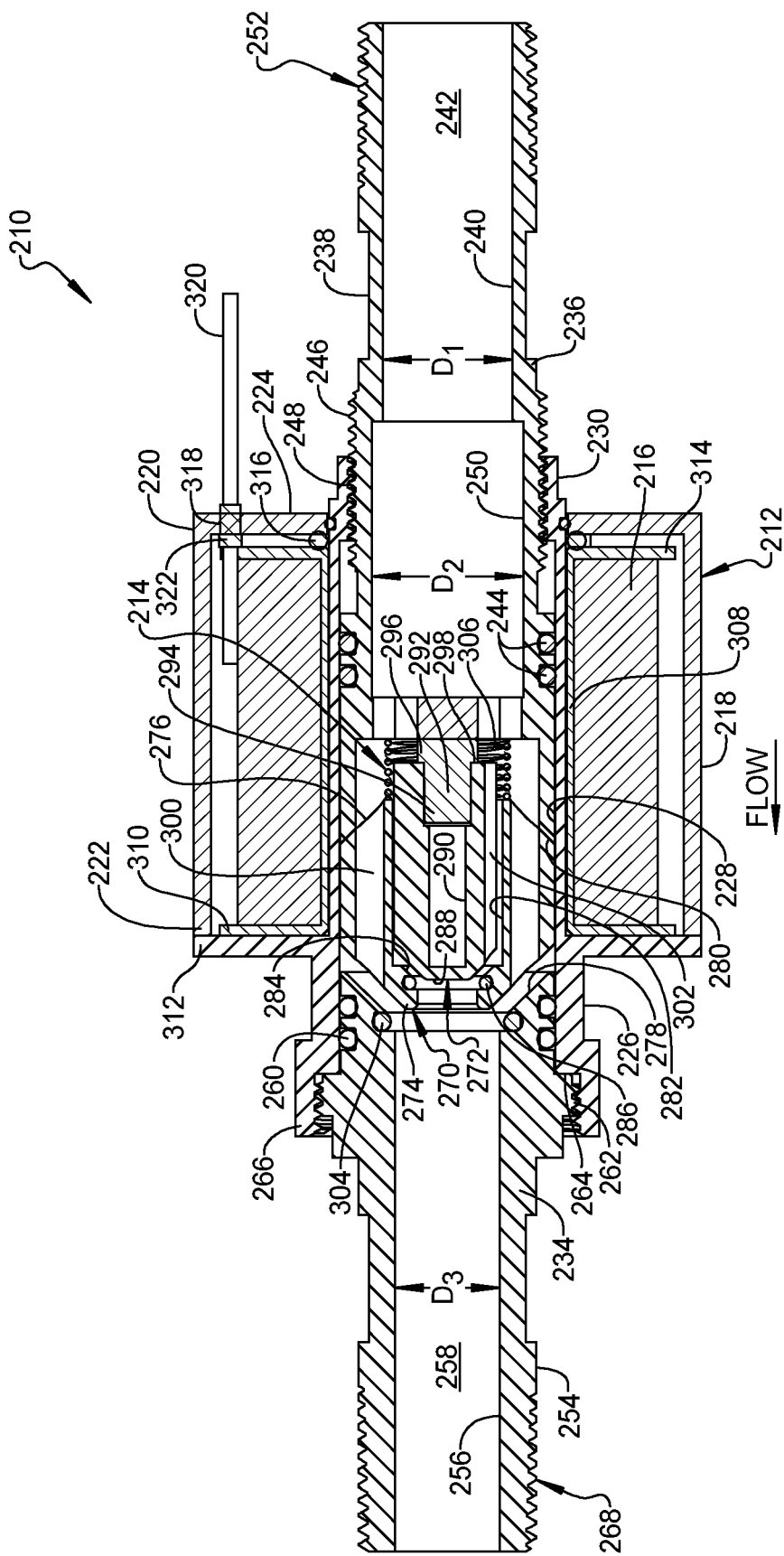
FIG. 8 is a cross-sectional view of the valve illustrated in FIG. 6, in a high-flow state.

FIGS. 6 to 8 illustrate another flow-through liquid valve 210 according to the present disclosure. Valve 210 is an electromechanical valve including an outer shell or housing 212, an armature assembly 214 provided within housing 212, and a coil 216 positioned between the housing 212 and the armature assembly 214 that, when energized, will actuate the armature assembly 214 to open and close valve 210. Housing 212 includes a cylindrical body 218 having a first end 220 and a second end 222. First end 220 includes a radially inwardly extending wall 224. Housing 212 may be formed of a material such as steel or any other material known to one skilled in the art that is capable of generating a magnetic field during use of the electromechanical valve 210.

An inner shell 226 that includes an inner surface 228 and an exterior surface 230 may be provided between coil 216 and armature assembly 214. Inner shell 226 houses armature assembly 214, a valve seat 234, and a pole member 236, with coil 216 being located between housing 212 and inner shell 226. Pole member 236 is a generally cylindrically shaped member having an outer surface 238 and an inner surface 240 that defines a flow path 242 therethrough. To provide a seal between inner shell 226 and pole member 236, a pair of o-rings 244 may be positioned between inner shell 226 and outer surface 238. A portion of pole member 236 includes a threaded surface 246 that mates with a corresponding threaded surface 248 formed on inner surface 228 of inner shell 226. Inner surface 240 of pole member 236 is cylindrical and has a first inner diameter D1, which is variable. As inner surface 240 extends toward armature assembly 214, inner surface 240 radially expands such that a radially expanded section 250 of inner surface 240 having a second inner diameter D2 is formed. Similar to D1, D2 is variable. Pole member 236 may also include a threaded inlet portion 252 formed unitary therewith. It should be understood, however, that inlet portion 252 may be separate and apart from pole member 236 and attached to pole member 236 by brazing, welding, or some other attachment method without departing from the scope of the present disclosure.

Similar to pole member 236, valve seat 234 is a generally cylindrical member having an exterior surface 254 and an inner surface 256 that defines a flow path 258. To provide a seal between inner shell 226 and valve seat 234, a pair of o-rings 260 may be positioned between inner shell 226 and exterior surface 254. In addition, valve seat 234 includes a radially outwardly extending threaded flange 262 that defines a shoulder 264 for abutting a threaded end 266 of inner shell 226. Inner surface 256 of valve seat 234 is cylindrical and has an inner diameter D3 that is illustrated as being less than inner diameter D1 of pole member 236. It should be understood, however, that D1 and D3 can be of varying size and may be equal without departing from the scope of the present disclosure. Valve seat 234 may also include a threaded outlet portion 268 unitary therewith. It should be understood, however, that outlet portion 268 may be separate and apart from valve seat 234 and attached to valve seat 234 by brazing, welding, or some other attachment method without departing from the scope of the present disclosure.

Armature assembly 214 is a two-piece structure that, when valve 210 is desired to be in an open state, can provide a low-flow state and a high-flow state. In this regard, armature assembly 214 includes a first or low-flow armature 270 and a second or high-flow armature 272. Similar to armature 30, first armature 270 is a hollow cylindrically-shaped member having a first bullet-shaped end 274 and a second bullet-shaped end 276 that mate with correspondingly conically-shaped seating surfaces 278 and 280 formed in each of valve seat 234 and pole member 236 such that when armature assembly 214 is actuated between closed (FIG. 6) and open (FIGS. 7 and 8) positions the bullet-shaped ends 274 and 276 will seat against the conically-shaped seating surfaces 278 and 280, respectively. First armature 270 includes an axially extending passage 282 that is radially narrowed at first bullet-shaped end 274 to define a conical seating surface 284 for second armature 272, which is movable received within axially extending passage 282. Seating surface 284 includes a sealing member 286 that contacts second armature 272.

Second armature 272 is a cylindrically-shaped member having a bullet-shaped end 288 that is configured to mate with conical seating surface 284. Second armature 272 is movable relative to first armature 270, but is also configured to move with first armature 270 when armature assembly 214 is actuated. Second armature 272 includes an axially-extending recess 290 that extends substantially the entire length of second armature 272, but terminates prior to reaching bullet-shaped end 288. A bolt-shaped plug 292 is seated within recess 290. Plug 292 includes a shank portion 294 seated within recess 290, and a head portion 296 having a greater diameter than shank portion 294 that is abutted against an end 298 of second armature 272.

First armature 270 and plug 292 may be formed of a magnetic material that is designed to cooperate with coil 216 when coil 216 is energized. First armature 270 includes a plurality of flow ports 300 that extend axially through first armature 270 from first bullet-shaped end 274 toward second bullet-shaped end 276, and also radially outward toward inner shell 226 such that first armature 270 is butterfly-shaped when viewed along an axial length of first armature 270 (see, e.g., FIG. 3). Second armature 272 also includes a plurality of flow ports 302 that extend from end 298 toward bullet-shaped end 288, and also radially outward toward first armature 270 such that second armature 272 is also butterfly-shaped when viewed along an axial length of second armature 272.

First and second armature 270 and 272 include four flow ports 300 and 302, respectively. It should be understood, however, that a greater or lesser number of flow ports 300 and 302 can be used, respectively, without limitation. When valve 210 is in an open state, fluid is allowed to flow from inlet portion 252 through pole member 236, through flow ports 300 and/or 302 toward and through valve seat 234, and out of outlet portion 268. Because flow ports 300 and 302 are axially aligned with flow paths 242 and 258, fluid flowing through valve 210 is subjected to less turbulence when flowing through valve 210. Further, bullet-shaped ends 274, 276, and 288 allow fluid to flow easily into and exit from flow ports 300 and/or 302 to further decrease turbulence. Thus, if the fluid is beer or some other type of carbonated beverage, less foam is produced when fluid travels through valve 210. When valve 210 is in a closed state (FIG. 6), first bullet-shaped end 274 of first armature 270 seats against valve seat 234, and bullet-shaped end 288 of second armature 272 seats against conical seating surface 284 of first armature 270. To ensure that no fluid may get past valve seat 234 when valve 210 is closed, conically-shaped surface 278 of valve seat 234 may include a seal member 304 that engages with first bullet-shaped end 274 of first armature 270, and conical seating surface 284 includes sealing member 286 that engages with bullet-shaped end 288 of second armature 272.

A spring member 306 is positioned between first armature 270 and pole member 236 and is configured to bias first armature 270 into engagement with valve seat 234 when valve 210 is in a closed state (FIG. 6). Spring member 306 is illustrated as being a coil spring, but other springs known to one skilled in the art can be used, if desired.

As noted above, coil 216 is located between armature assembly 214 and housing 212. Coil 216 is located within a cylindrical coil seat 308 with one end 310 abutted against a radially outwardly extending flange 312 of inner shell 226, and another end 314 located proximate radially inwardly extending wall 224 of housing 212. A seal member 316 is located between coil seat 308 and radially inwardly extending wall 224.

Radially inwardly extending wall 224 includes an aperture 318 for allowing a conductor 320 to pass through radially inwardly extending wall 224 and provide a current to coil 216. A coupling 322 is located within aperture 318 and seals conductor 320.

FIG. 6 illustrates valve 210 when valve 210 is in a closed state. In this regard, no current is applied to conductor 320 such that coil 216 is not energized. FIGS. 7 and 8 illustrate valve 210 when valve 210 is in an open state. As noted above, to actuate armature assembly 214, a current is applied to coil 216 from a current source (not shown) via conductor 320. When coil 216 is energized, coil 216 will magnetically interact with armature assembly 214 to pull armature assembly 214 back toward pole member 236. As armature assembly 214 is pulled back toward pole member 236, fluid from fluid inlet portion 252 will enter valve 210, travel through flow ports 300 and/or 302 formed in armature assembly 214, and through valve seat 234 to fluid outlet 268. To close valve 210, current from the current source (not shown) to coil 216 is stopped such that coil 216 is no longer energized, which removes the magnetic interaction between coil 216 and armature assembly 214. Spring member 306 then biases armature assembly 214 back into sealing engagement with valve seat 234.

FIG. 7 illustrates a low flow state of the valve 210 when valve 210 is in a first open position. As illustrated in FIG. 7, only first armature 270 has been actuated by coil 216 such that first bullet-shaped end 274 has been pulled away from conically-shaped seating surface 278 to allow fluid to pass through flow ports 300. That is, in the low flow state of valve 210, second armature 272 remains seated against conical seat surface 284 such that no fluid can flow through flow ports 302. This is accomplished by controlling the amount of current passing through conductor 320 to coil 216. More particularly, the amount of current applied to coil 216 is only sufficient to interact with the magnetic material of first armature 270. In other words, because plug 292 is located a further distance away from coil 216, when a smaller current is applied to coil 216, only first armature 270 will interact with coil 216 to open valve 210 into the low flow state.

FIG. 8 illustrates a high-flow state of the valve 210 when valve 210 is in a second open position. As illustrated in FIG. 8, each of first armature 270 and second armature 272 have been actuated by coil 216 such that first bullet-shaped end 274 has been pulled away from conically-shaped seating surface 278 to allow fluid to pass through flow ports 300, and bullet-shaped end 288 of second armature 272 is pulled away from conical seat surface 284 such that fluid can flow through flow ports 302. Because fluid can flow through both flow ports 300 and flow ports 302, a greater amount of fluid is allowed to pass through valve 210. This is accomplished by increasing the amount of current passing through conductor 320 to coil 216. That is, the greater amount of current applied to coil 216 is sufficient to interact with the magnetic material of first armature 270 and the magnetic material of the plug 292. In other words, even though plug 292 is located a further distance away from coil 216, because a greater amount of current is applied to coil 216, each of the first armature 270 and the plug 292 will interact with coil 216 to fully open valve 210 into the high flow state.

It should also be understood that another spring (not illustrated) may be located between second armature 272 and pole member 236 that biases second armature 272 against sealing member 286.

As shown in FIGS. 7 and 8, armature assembly 214 includes flow ports 300 and 302 that allow the fluid to flow through armature assembly 214 rather than around armature assembly 214 when valve 210 is open. This configuration allows armature assembly 214 to be located closer to coil 216. Further, since substantially less fluid is located between armature assembly 214 and coil 216, less interference that affects magnetic interaction between armature assembly 214 and coil 216 is present, which allows for less power or current being needed to actuate armature assembly 214— even in the high flow state where both first armature 270 and second armature 272 are actuated. This is a significant aspect of the present disclosure in that because less power is needed to actuate valve 210, less heat is generated when coil 216 is energized. Because less heat is generated, less heat is transferred to the fluid passing through valve 210. Valve 210, therefore, can be used in fluid applications such as beverage delivery where it is undesirable for the fluid to be heated during use of the valve 210.

Although the flow of fluid through valve 210 has been described as being from fluid inlet 252 to fluid outlet 268, it should be understood that valve 210 can operate in the opposite direction as well. That is, fluid outlet 268 may function as a fluid inlet, and fluid inlet 252 may function as a fluid outlet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve, comprising:
    a housing;
    a valve seat provided in the housing;
    an armature assembly positioned in the housing proximate the valve seat, the armature assembly being movable towards and away from the valve seat, and including a first armature, and a second armature that is movable relative to the first armature; and
    a coil that is configured to actuate the armature assembly away from the valve seat to open the valve,
    wherein upon application of a first current to the coil, the first armature and the second armature are each actuated away from the valve seat to a first open state, and
    upon application of a second current that is greater than the first current to the coil, the second armature is actuated away from the first armature to a second open state, the second open state permitting an amount of fluid flow through the valve that is greater than the first open state.

2. The valve according to claim 1, wherein the second armature is seated within the first armature.

3. The valve according to claim 2, wherein each of the first armature and the second armature includes a plurality of ports formed therein that allow a fluid to flow through an interior of the armature assembly,
    in the first open state, fluid is permitted to flow through the plurality of ports of the first armature, and fluid is not permitted to flow through the plurality of ports of the second armature, and
    in the second open state, fluid is permitted to flow through the plurality of ports in each of the first armature and the second armature.

4. The valve according to claim 2, wherein the first armature is a hollow cylindrically-shaped member having a first bullet-shaped end and an opposite second bullet-shaped end, the first bullet-shaped end corresponding to a conically-shaped recess formed in the valve seat.

5. The valve according to claim 4, wherein an interior of the hollow cylindrically-shaped member defines a conical seat that is engaged by the second armature in a closed state of the valve.

6. The valve according to claim 5, wherein the second armature is a hollow cylindrical member including a bullet-shaped end that corresponds to the conical seat of the first armature, and includes a magnetic plug positioned within an interior thereof that cooperates with the coil when the second current is applied to the coil.

7. The valve according to claim 1, further comprising a spring that biases the armature assembly towards the valve seat.

8. The valve according to claim 1, further comprising an inner shell between the coil and the armature assembly.

9. The valve according to claim 8, wherein the coil is located between the inner shell and the housing.

10. A valve comprising:
    a housing;
    a valve seat provided in the housing;
    a first armature formed of a magnetic material that is configured to mate with the valve seat when the valve is in a closed state, and be spaced apart from the valve seat when the valve is in an open state, the first armature including an axially extending passage that extends a length of the first armature, and a first plurality of fluid ports positioned radially outward from the axially extending passage that extend axially along the length of the first armature;
    a second armature positioned within the axially extending passage of the first armature, the second armature being movable relative to the first armature and including an axially extending recess formed therein that houses a magnetic plug, and the second armature including a second plurality of fluid ports positioned radially outward from the axially extending recess that extend axially along a length of the second armature; and a coil that is configured to actuate the first and second armatures to open the valve, wherein upon application of a first current to the coil, the magnetic material of the first armature interacts with the coil to actuate the first and second armatures away from the valve seat to place the valve in a first open state, and upon application of a second current that is greater than the first current to the coil, the magnetic plug of second armature interacts with the coil to actuate the second armature away from the first armature to place the valve in a second open state, the second open state permitting an amount of fluid flow through the valve that is greater than the first open state.

11. The valve according to claim 10, wherein in the first open state, fluid is permitted to flow through the first plurality of ports of the first armature, and fluid is not permitted to flow through the second plurality of ports of the second armature, and in the second open state, fluid is permitted to flow through the first and second plurality of ports in each of the first armature and the second armature, respectively.

12. The valve according to claim 10, wherein the first armature has a first bullet-shaped end and an opposite second bullet-shaped end.

13. The valve according to claim 10, wherein the axially extending passage of the first armature defines a conical seat that is engaged by the second armature in the closed state of the valve.

14. The valve according to claim 13, wherein the second armature is a hollow cylindrical member including a bullet-shaped end that corresponds to the conical seat of the first armature, and includes the magnetic plug positioned within an interior thereof that cooperates with the coil when the second current is applied to the coil.

15. The valve according to claim 10, further comprising a spring that biases the first armature towards the valve seat.

16. The valve according to claim 10, further comprising an inner shell between the coil and the first armature, wherein the coil is located between the inner shell and the housing.

* * * * *